Patented Aug. 23, 1932

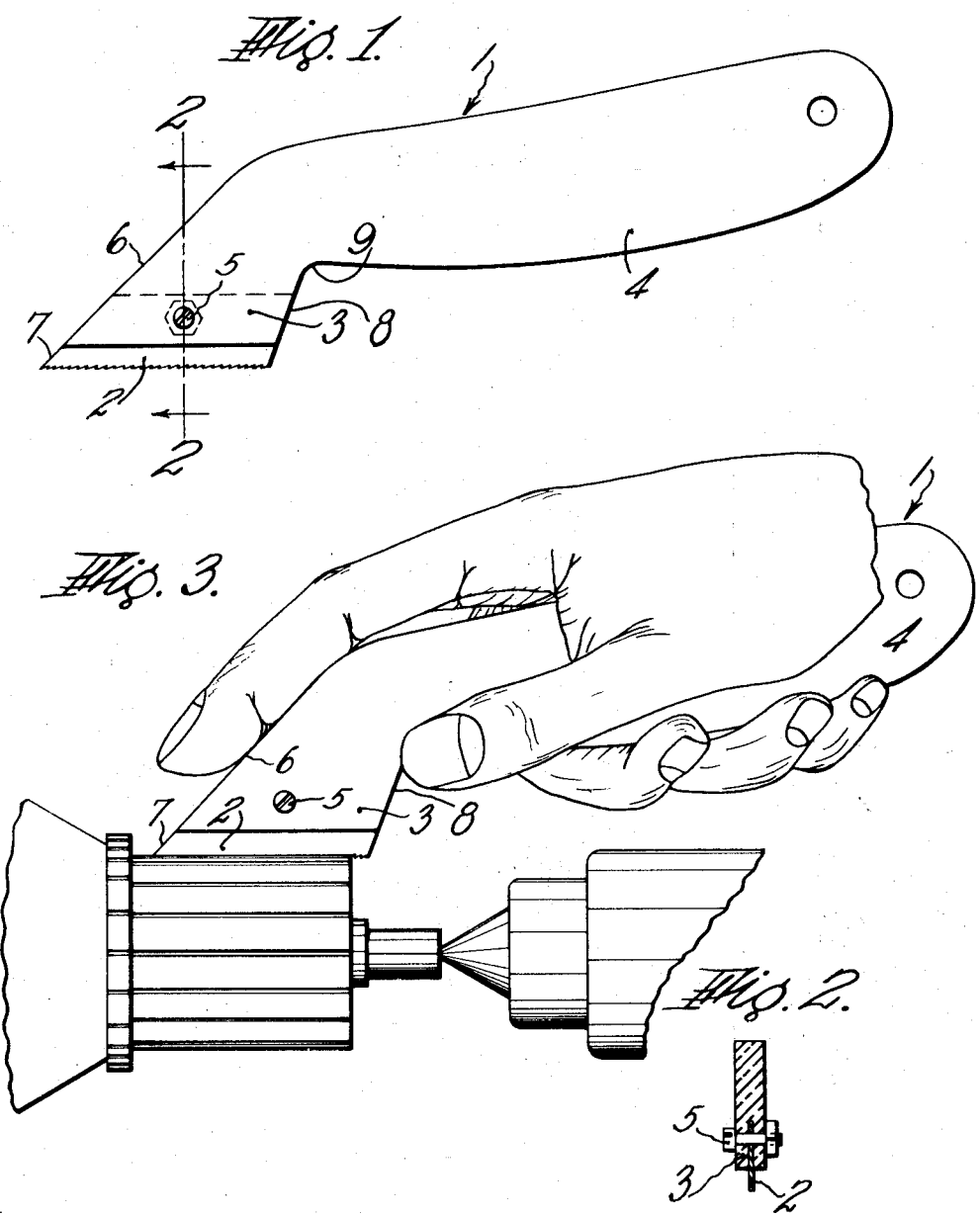

1,872,939

UNITED STATES PATENT OFFICE

WILLIAM W. HADDICAN, OF SPRINGFIELD, MASSACHUSETTS

COMMUTATOR UNDERCUTTING TOOL

Application filed December 22, 1930. Serial No. 504,056.

This invention relates to a hand tool known as an undercutting tool for commutators. As is well known, the wear of the brushes on a commutator of an electric motor or generator causes the mica separators between the copper contacts to become flush with or project above said contacts, thereby necessitating a milling or cutting down of said mica inserts below the surface of the contacts. The object of the present invention is the provision of a hand tool of simple and inexpensive structure especially designed to conveniently and effectively perform this milling or cutting operation on the mica inserts of the commutator.

Referring to the drawing:

Fig. 1 is a side view of the tool;

Fig. 2 is a section along line 2—2 of Fig. 1; and

Fig. 3 is a view of the tool at work on a commutator and illustrating the convenience and effectiveness afforded by its shape for grasping and guiding the tool in its work.

The tool is preferably made up of two parts,—the holder indicated generally at 1, and the saw tooth blade 2 which may be fastened in the holder in any suitable manner, the manner herein shown being by means of a single bolt 5 which passes through the blade holding portion 3 and the blade. The blade 2 may be a suitably shaped piece of a hacksaw blade and should be of a thickness approximately equal to that of the mica insert which is to be milled down. This blade is replaceable in the holder so that a blade of the proper thickness may be employed for the work in hand.

The shape of the blade may be trapezoidal, having its top edge parallel with the tooth edge so as to seat in the slotted portion of the holder hereinafter described and having its front edge 7 inclined backwardly at an acute angle from its tooth edge so as to provide a narrow pointed portion which will reach into the corners of the commutator slots in the performance of its work most effectively.

The holder of the tool indicated generally at 1 is made up of a thin flat single piece of rigidly compressed fibre formed with its blade holding portion 3 at the forward end and an upwardy offset horizontal handle portion 4 adapted to be grasped in the hand. The blade holding portion 3 is substantially coextensive in length with the blade 2 and has a slot in its bottom edge adapted to receive said blade rigidly seated therein. The holder 1 is preferably of uniform thickness throughout and, as shown in the sectional view Fig. 2 its thickness need only be slightly greater than that of the saw blade 2. By making the holder of rigidly compressed fibre instead of wood, it is possible to provide this relatively thin flat structure for the holder without danger of splitting the same at the slotted blade holding portion. The choice of this material for the holder also enables it to be made conveniently of one integral piece and much lighter in weight than would be a metal holder of the same structural strength and shape.

An important feature of the holder is the character of its shape and design in enabling it to be grasped in the hand and properly applied to its work. For this purpose the blade holding portion of the holder is closely adjacent the handle, as shown, and the front of the blade holding portion (indicated at 6) is inclined downwardly and forwardly from the top of the handle and at approximately the same acute angle as the front end 7 of the blade so as to form a continuation thereof. The back 8 of the blade holding portion rises more abruptly and joins the underside of the handle portion by a curved neck 9 as shown. Due to this shape, the holder may be grasped in the hand as indicated in Fig. 3 with the forefinger extending forwardly to rest upon the inclined portion 6 at a point closely adjacent to the front end of the saw blade and the thumb extended for a thrust against the abrupt back 8 of the blade holding portion, whereby an effective pressure may be exerted on the blade while at the same time keeping the tool under very accurate guiding control during its reciprocatory stroke in the milling operation.

The handle portion of the tool is sufficiently broad for a firm grasp in the palm and remaining fingers of the hand while the thumb and forefinger are extended as described for a pinching grip upon the business end of the tool close to its point of application to the work. In some cases the shaft of the commutator being worked upon will be held in a lathe or other suitable clamping apparatus and the offset portion of the tool handle serves to raise the hand sufficiently to keep the fingers clear of such holding apparatus when applying the tool to the work.

It will thus be observed that the present tool is designed with particular object in view of being manipulated most effectively with the hand in its natural and unstrained position for such work.

What I claim is:

1. A commutator undercutting tool comprising a saw blade, a thin flat one-piece holder therefor composed of rigidly compressed fibre, said holder being formed with a slotted blade holding portion substantially coextensive in length with said blade and an upwardly offset horizontal handle portion, and a forefinger rest on top and near the forward end of said blade holding portion.

2. A commutator undercutting tool comprising a saw blade, a thin flat one-piece holder therefor formed with a blade holding portion and an upwardly offset horizontal handle portion, the blade holding portion being slotted at its lower edge to receive the blade and the top edge of said blade holding portion being inclined downwardly and forwardly to the front end of said blade, whereby when the handle is grasped in the hand the forefinger may extend along said inclined top to a point adjacent the front end of said blade.

3. A commutator undercutting tool comprising a saw blade with its front end at an acute angle to the tooth edge thereof, a thin flat one-piece holder for said blade formed with a blade holding portion substantially coextensive in length with said blade and an upwardly offset horizontal handle portion, the blade holding portion having a slot in its lower edge to receive the blade and the top edge of said blade holding portion being inclined downwardly and forwardly from said handle portion at the same acute angle as the front end of said blade, whereby when the handle is grasped in the hand the forefinger may extend along said inclined top to a point adjacent the front end of said blade.

In testimony whereof I have affixed my signature.

WILLIAM W. HADDICAN.